July 30, 1968 A. KRUGER 3,394,488

MOUSE TRAP

Filed Sept. 30, 1966

INVENTOR.
ALBERT KRUGER
BY Merchant & Gould
ATTORNEYS

United States Patent Office 3,394,488
Patented July 30, 1968

3,394,488
MOUSE TRAP
Albert Kruger, Box 344, Edgeley, N. Dak. 58433
Filed Sept. 30, 1966, Ser. No. 583,261
5 Claims. (Cl. 43—81)

This invention relates generally to animal traps, and more particularly to improvements in traps of the type commonly employed in the killing of rats and mice.

Briefly stated, this invention involves a triggering device for a trap comprising a base, a striking frame pivotally mounted on the base for swinging movements between set and sprung positions, a spring urging the striking frame toward its sprung position, and a bar for releasably holding this striking frame in its set position. The triggering device of this invention comprises a hood having a top wall portion, spaced side wall portions and a rear bar engaging portion, and defining an open bottom and an open front providing access to bait mounted on the base under the hood. The arrangement is such that the head of the animal, entering the open front of the hood to obtain the bait, moves the hood slightly in an upward direction to spring the trap. In mouse or rat traps of the open type heretofore produced, access to the bait is had from either side, as well as from the front end, of the trap. In many instances, such arrangements result in less than immediately fatal injury to the animal, often permitting the animal to drag the trap to some hidden area where the animal finally dies, the odor of the decaying body usually being very offensive. Further, traps having the commonly used bait supporting trigger elements are somewhat difficult to set by unskilled persons, often resulting in premature springing of the trap while being handled and sometimes causing injury to the operator.

An important object of this invention is the provision of an animal trap having novel trigger means which may be set with a maximum ease and safety to the operator.

Another object of this invention is the provision of a trap having means for guiding an animal to the bait in such manner that, when the trap is sprung, the animal is instantly and humanely killed.

Another object of this invention is the provision of trigger means for an animal trap which offers a minimum of resistance to triggering movement by an animal, and which requires a minimum of movement to spring the trap.

Yet another object of this invention is the provision of a triggering device which will act as a deterrent to escaping movement of the animal during springing of the trap.

The above, and further highly important objects and advantages of this invention will become apparent from the following detailed specification, appended claims and attached drawings. Referring to the drawings, which illustrate the invention, and in which like reference characters indicate like parts throughout the several views;

Figure 1:
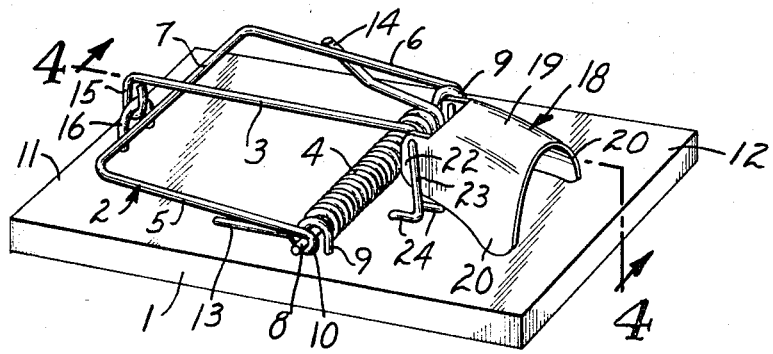
FIG. 1 is a view in perspective of an animal trap produced in accordance with this invention.

Referring with greater detail to the drawings, an animal trap, such as a mouse trap, is shown as comprising a generally rectangular base 1 having mounted thereon a striking frame, indicated generally at 2, a bar 3 for releasably holding the striking frame 2 in a trap set position, and a coiled torsion spring 4. The base 1 is preferably made from wood or suitable plastics, and the striking frame 2 is made from a length of relative rigidly wire bent to generally rectangular form, the striking frame 2 comprising a pair of laterally spaced generally parallel side arms 5 and 6, a jaw acting portion 7, and a shaft portion 8 generally parallel to the jaw acting portion 7. The shaft portion 8 is loosely journalled in a pair of laterally spaced staples 9 driven into the longitudinally intermediate portion of the base 1, the free end of the side arm 5 being bent to provide an eye 10 for reception of the adjacent end of the shaft portion 8.

Figure 2:
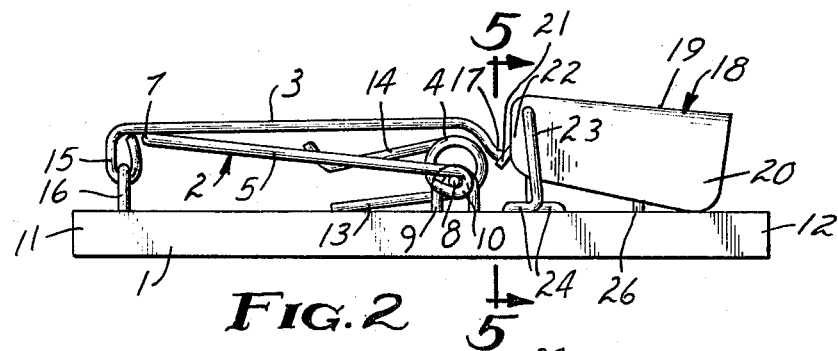
FIG. 2 is a view in side elevation.
Figure 4:
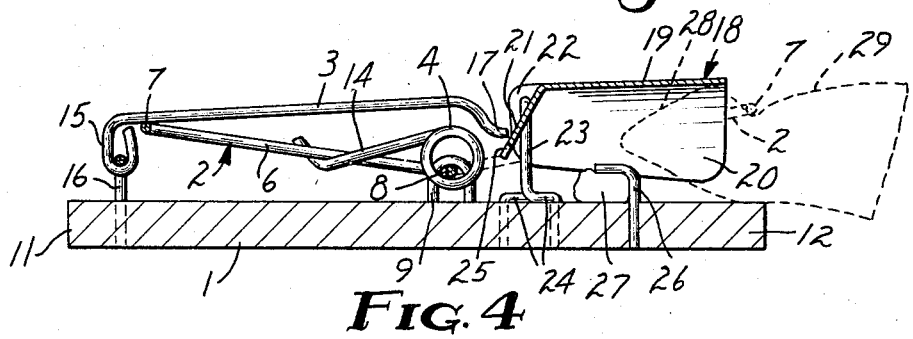
FIG. 4 is a longitudinal section taken on the line 4—4 of FIG. 1, but showing a different position of some of the parts.

The striking frame 2 is movable about the axis of the shaft portion 8 between a trap set position shown by full lines in FIGS. 1, 2 and 4, wherein the jaw acting portion 7 overlies the rear end portion 11 of the base 1, and a sprung position, wherein the jaw acting portion 7 is disposed adjacent the front end 12 of the base 1, as shown by dotted lines in FIG. 4. The torsion spring 4 loosely encompasses the striking frame shaft portion 8 between the staples 9, and is formed to provide a pair of generally radially extending end portions 13 and 14, the former of which bears against the top surface of the base 1, and the later of which engages the side arm 6 of the striking frame 2, the torsion spring 4 yieldingly urging the striking frame 2 toward its sprung position. The bar 3 normally extends longitudinally of the base 1 in overlying relation to the striking frame 2 in its set position, the rear end of the bar 3 being formed into a closed loop 15 through which extends a staple 16 anchored to the rear end portion 11 of the base 1. The front end of the bar 3 normally curves downwardly over the torsion spring 4, and is formed to provide a normally generally horizontally disposed front end 17 forwardly of the spring 4. With reference particularly to FIGS. 2 and 4, it will be seen that, in the set position of the trap, the rear end portion of the bar 3 just forwardly of the loop 15 engages the central portion of the jaw acting portion 7 to retain the striking frame 2 in its set position.

Figure 3:
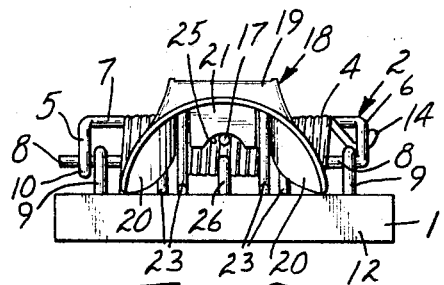
FIG. 3 is a view in front end elevation, as seen from the right to the left with respect to FIG. 2.
Figure 5:
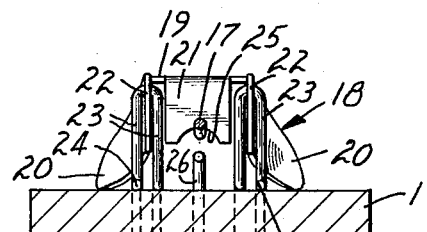
FIG. 5 is a transverse section taken on the line 5—5 of FIG. 2.

Means for triggering or springing the trap comprises a hood 18 formed from lightweight material, such as aluminum, to provide a top wall portion 19, laterally spaced side wall portions 20, and a rear portion 21, the hood 18 having an open front and an open bottom. As shown, the rear ends of the side wall portions 20 extend rearwardly of the top wall 19 to provide laterally spaced parallel generally vertical flanges 22 having aligned apertures adajcent their upper ends for pivotal reception of mounting staples 23. It will be noted that each of the staples 23 are formed to provide horizontally disposed leg portions 24 which engage the top surface of the base 1 when the staples are mounted therein, whereby to reinforce the staples 23 against angular displacement in directions generally longitudinally of the base 1, so that the aligned pivot axes of the hood 18 remains stable. The rear portion 21 of the hood 18 is integrally formed with the top wall portion 19 generally forwardly and upwardly of the pivot axis of the hood 18, and slopes downwardly and rearwardly from the top wall 19 between the staples 23 to a point rearwardly and in substantial downwardly spaced relation to the axis of pivotal movement of the hood 18, the lower edge of the rear portion 21 defining a downwardly opening notch 25 for reception of the front end 17 of the retaining bar 3. With reference particularly to FIGS. 3 and 5, it will be seen that the opposite sides of each of the staples 23 are disposed closely adjacent their respective flanges 22 of the side wall portions 20 so as to limit lateral or sideways movement of the hood 18. Further, the width of the rear portion 21 is substantially less than the spacing between the staples 23, whereby to permit free pivotal movement of the hood 18. It will be further noted that the side wall portions 20 of the hood 18 flare outwardly and forwardly toward the front end of the base 1 whereby to provide for free access of an animal's head into the interior of the hood 18 from the front end 12 of base 1.

The greater part of the hood 18 being disposed forwardly of the supporting staples 23, the hood 18 is gravity biased in a downward direction so that the lower edges of the side wall portions 20 normally rest upon the stop surface of the base 1. The hood 18 overlies a generally L-shaped bait holding pin 26 that is driven into the base 1, a suitable bait 27 being shown in FIG. 4. In order to reach the bait, a mouse or other animal, the head and neck portions of which are shown by dotted lines in FIG. 4 and indicated at 28 and 29 respectively must insert its head into the interior of the hood 18 from the front end 12 of the trap. The hood 18 is of such height that the animal must move the same upwardly to get to the bait 27, thus causing the rear portion 21 to swing generally forwardly out of engagement with the front end 17, thereby triggering the trap and permitting the striking frame 2 to spring to trapping position. The side wall portions 20 of the hood 18 prevent the animal from moving in a sideways direction when the trap is triggered, and the jaw acting portion of 7 of the striking frame 2 strikes the animal on the back of the neck or the top of the head, instantly killing the same.

The above described trap may be very easily and safely set without danger of injury to the user. First, with the trap in a sprung condition, the hood 18 may be swung upwardly to a point where the bait 27 may be easily positioned under the holding pin 26. Then, with the base 1 held in a generally horizontal position, the hood 18 is permitted to swing downwardly to its position of FIG. 2, in contact with the top surface of the base 1. The striking frame 2 is then swung to its set position wherein the same may be held by gripping the rear end portion 11 of the base 1 and the jaw acting portion 7 between the thumb and fingers of one hand. The bar 3 is then moved forwardly and downwardly over the striking frame 2, the front end 17 of the bar 3 engaging the rear surface of the rear hood portion 21 and swinging the same forwardly until the front end 17 descends below the notch 25. When this occurs the hood 18 will drop to its position of FIGS. 2, 3 and 5, with the notch 25 overlying the front end 17 of the retaining bar 3. Then, by releasing manual pressure on the jaw acting portion 7, the striking frame 2 will swing upwardly into engagement of the jaw acting portion 7 with the adjacent portion of the bar 3, whereby to raise the same so that the front end 17 thereof moves against the lower edge of the rear portion 21 within the notch 25. Thus, the trap is quickly and easily set with both hands of the user being disposed at the rear end portion of the trap substantially out of the path of movement of the striking frame 2 and remote from the front end portion 12 of the base 1.

While I have described the hood 18 as being formed from lightweight sheet metal, the same may be formed or molded from any suitable material, such as synthetic plastics or the like, if desired.

What is claimed is:

1. In a mouse trap including, a base having front and rear ends, a generally rectangular striking frame pivotally secured to the base intermediate its ends for swinging movements between opposed set and sprung positions, a spring urging said striking frame toward its sprung position, a bar pivotally secured at one end to the rear end of the base for retaining the striking frame in its set positon, said bar having a front end normally disposed forwardly of the axis of swinging movement of the striking frame, and bait holding means on said base between the axis of swinging movement of the striking frame and the front end of the base; the improvement comprising, a mouse guiding and frame triggering hood overlying said bait holding means, said hood having a top wall portion, laterally spaced side wall portions and a bar engaging rear portion, said hood having an open front and bottom, and means pivotally mounting said hood at its upper rear end for swinging movements on an axis parallel to the axis of swinging movement of said striking frame and toward and away from said base, said bar engaging rear portion being disposed in overlying engagement with said bar adjacent the front end of the bar and in rearwardly and downwardly spaced relation to the axis of said swinging movement of the hood when the trap is set.

2. The mouse trap defined in claim 1 in which said bar engaging rear portion of the hood comprises a rear wall portion joined with said top wall portion forwardly of the axis of swinging movement of the hood and sloping downwardly and rearwardly therefrom.

3. The mouse trap defined in claim 2 in which said rear wall portion of the hood is formed to provide a downwardly opening bar engaging notch.

4. The mouse trap defined in claim 1 in which said side wall portions of the hood flare laterally outwardly toward the front end of the base.

5. The mouse trap defined in claim 1 in which the side wall portions of said hood adjacent the rear end thereof are generally vertically disposed, said side wall portions having aligned openings adjacent their rear ends and adjacent said top wall portion, said means mounting the hood for swinging movement comprising a pair of laterally spaced staples each extending through the opening in a different one of said side wall portions and disposed closely adjacent their respective side wall portions, whereby to provide a substantial space therebetween for reception of the front end of said bar and said bar engaging rear portion of the hood.

References Cited
UNITED STATES PATENTS

| 1,473,242 | 11/1923 | Marshall | 43—81 |
| 2,103,877 | 12/1937 | Stilson | 43—81 |
| 2,260,872 | 10/1941 | Schmidt | 43—81 |

FOREIGN PATENTS

| 404,587 | 1/1934 | Great Britain. |
| 408,556 | 4/1934 | Great Britain. |

WARNER H. CAMP, *Primary Examiner.*